(12) United States Patent
Kawahara et al.

(10) Patent No.: US 9,618,105 B2
(45) Date of Patent: Apr. 11, 2017

(54) FLUID POWER TRANSMISSION DEVICE

(71) Applicant: EXEDY Corporation, Neyagawa-shi, Osaka (JP)

(72) Inventors: Yuki Kawahara, Neyagawa (JP); Yusuke Okamoto, Neyagawa (JP); Yusuke Okamachi, Neyagawa (JP)

(73) Assignee: EXEDY Corporation, Osaka (JP)

( * ) Notice: Subject to any disclaimer, the term of this patent is extended or adjusted under 35 U.S.C. 154(b) by 129 days.

(21) Appl. No.: 14/647,006

(22) PCT Filed: Jan. 23, 2015

(86) PCT No.: PCT/JP2015/051935
§ 371 (c)(1),
(2) Date: May 22, 2015

(87) PCT Pub. No.: WO2015/170485
PCT Pub. Date: Nov. 12, 2015

(65) Prior Publication Data
US 2016/0258521 A1    Sep. 8, 2016

(30) Foreign Application Priority Data
May 7, 2014 (JP) ................. 2014-095817

(51) Int. Cl.
*F16H 45/02* (2006.01)
*F16F 15/134* (2006.01)
(Continued)

(52) U.S. Cl.
CPC ............ *F16H 45/02* (2013.01); *F16F 7/10* (2013.01); *F16F 15/134* (2013.01);
(Continued)

(58) Field of Classification Search
CPC .................... F16D 45/02–2045/0294; F16F 15/14–15/1457
See application file for complete search history.

(56) References Cited

U.S. PATENT DOCUMENTS 4,844,216 A * 7/1989 Fukushima ............. F16H 45/02
                                                      192/103 B
5,713,442 A    2/1998 Murata et al.
(Continued)

FOREIGN PATENT DOCUMENTS

JP    09-264399 A    10/1997
JP    10-238611 A    9/1998
(Continued)

*Primary Examiner* — Richard Lorence
(74) *Attorney, Agent, or Firm* — Global IP Counselors, LLP (57) ABSTRACT

A torque converter includes a torque converter body, a lock-up device, and a dynamic damper. The lock-up device includes an output plate coupled to a turbine. The dynamic damper is fixed to the output plate of the lock-up device, and is configured to attenuate variation in speed of rotation from the engine. The dynamic damper includes a base plate, an inertia unit, and an elastic unit. The base plate is fixed to the output plate. The inertia unit is movable relative to the base plate in a rotational direction. The elastic unit exerts non-linear torsional characteristics, and elastically couples the base plate and the inertia unit in the rotational direction.

12 Claims, 11 Drawing Sheets

(51) Int. Cl.
*F16F 15/14* (2006.01)
*F16H 41/24* (2006.01)
*F16F 7/10* (2006.01)

(52) U.S. Cl.
CPC ........... *F16F 15/145* (2013.01); *F16H 41/24* (2013.01); *F16H 2045/0205* (2013.01); *F16H 2045/0226* (2013.01); *F16H 2045/0263* (2013.01); *F16H 2045/0278* (2013.01); *F16H 2045/0294* (2013.01)

(56) References Cited

U.S. PATENT DOCUMENTS

| | | | |
|---|---|---|---|
| 5,941,354 A | 8/1999 | Fukushima et al. | |
| 2004/0185940 A1 | 9/2004 | Yamamoto et al. | |
| 2010/0242466 A1* | 9/2010 | Krause | F16F 15/145 60/327 |
| 2012/0180473 A1 | 7/2012 | Huegel et al. | |
| 2014/0353105 A1* | 12/2014 | Tomiyama | F16F 15/134 192/3.23 |

FOREIGN PATENT DOCUMENTS

| | | |
|---|---|---|
| JP | 2004-278744 A | 10/2004 |
| JP | 2011-058557 A | 3/2011 |
| JP | 4648428 B | 3/2011 |
| JP | 2013-036587 A | 2/2013 |
| JP | 2013-506100 A | 2/2013 |

* cited by examiner

FLUID POWER TRANSMISSION DEVICE

CROSS-REFERENCE TO RELATED APPLICATIONS

This application is a U.S. National stage application of International Application No. PCT/JP2015/051935, filed Jan. 23, 2015, which claims priority to Japanese Patent Application No. 2014-095817, filed in Japan on May 7, 2014, the entire contents of which are hereby incorporated by reference.

BACKGROUND

Field of Invention

The present invention relates to a fluid power transmission device, particularly to a fluid power transmission device for transmitting power from an engine to a transmission through a fluid.

Background Information

A torque converter equipped with a lock-up device has been well-known as an exemplary fluid power transmission device. The lock-up device is a mechanism for mechanically coupling a front cover and a turbine, and is disposed in a space produced between the front cover and the turbine.

The lock-up device includes a clutch portion and a damper mechanism. The clutch portion includes a piston having, for instance, a friction member. Now when the piston is moved and the friction member is thereby pressed onto the front cover, power is configured to be transmitted from the front cover to the damper mechanism through the piston. The damper mechanism includes a plurality of elastic members and an output-side member to which power is transmitted through the elastic members. The output-side member is fixed to the turbine.

A dynamic damper has been installed in the lock-up device with the aforementioned construction. With the installation of the dynamic damper, it is possible to reduce a peak in variation of torque to be generated at or around the resonance frequency of the damper mechanism.

As described above, one large peak in variation of torque can be inhibited with the dynamic damper. However, two peaks in variation of torque instead appear at two rotation speeds, lower than and higher than, different from the rotation speed at which the one large peak is normally supposed to appear. One of the two peaks, i.e., the peak at the low rotation speed, appears in a rotation speed range lower than a normal rotation speed range. Thus, the peak is not problematic in use of the dynamic damper. By contrast, the other of the two peaks, i.e., the peak at the high rotation speed, normally appears in the normal rotation speed range. In view of this, a device for attenuating the peak at the high rotation speed has been provided as described in Japan Patent No. 4648428 and Japan Laid-open Patent Application Publication No. JP-A-2011-58557.

SUMMARY

In the device described in Japan Patent No. 4648428, the dynamic damper is equipped with a friction generating mechanism. The device is herein configured to increase a rate of attenuating variation in torque (variation in rotational speed) by regulating friction resistance in the friction generating mechanism. On the other hand, the device described in Japan Laid-open Patent Application Publication No. JP-A-2011-58557 is equipped with a lock mechanism configured to restrict activation of the dynamic damper in a desired rotation speed range. The device is configured to enhance attenuation performance by the activation of the dynamic damper until the rotation speed reaches a desired speed. When the rotation speed then reaches the desired speed, the device is configured to cause the lock mechanism to restrict the activation of the dynamic damper. The dynamic damper is thereby only allowed to function as an inertia unit. With the configuration, attenuation performance is enhanced in this rotation speed range.

However, in the device described in Japan Patent No. 4648428, friction resistance varies due to variation with time. Hence, stable performance cannot be achieved. On the other hand, in the device described in Japan Laid-open Patent Application Publication No. JP-A-2011-58557, the rotation speed varies at which the lock mechanism restricts the activation of the dynamic damper. Hence, it is difficult to stabilize attenuation performance.

The damper mechanism can be installed on the output side of the dynamic damper as a method of inhibiting the peak at the high rotation speed in variation of torque. However, the construction of this type of device may be complicated.

It is an object of the present invention to provide a fluid power transmission device equipped with a dynamic damper whereby high attenuation performance can be stably achieved in an entire normal rotation speed range with a simple construction.

A fluid power transmission device according to the present invention is a device for transmitting power from an engine to a transmission through a fluid. The fluid power transmission device includes a front cover, a fluid coupling body, a lock-up device and a dynamic damper. The fluid coupling body includes a turbine and is configured to transmit the power from the engine to the transmission through the fluid. The turbine is disposed to be unitarily rotatable with an input shaft of the transmission. The lock-up device is disposed between the front cover and the turbine. Additionally, the lock-up device includes a clutch portion and an output-side member. The clutch portion is configured to transmit or block the power from the front cover. The output-side member receives the power transmitted thereto from the clutch portion, and is coupled to the turbine. The dynamic damper is fixed to the output-side member of the lock-up device, and is configured to attenuate variation in speed of rotation from the engine. Furthermore, the dynamic damper includes a base plate, an inertia unit and an elastic unit. The base plate is fixed to the output-side member of the lock-up device. The inertia unit is movable relatively to the base plate in a rotational direction. The elastic unit exerts nonlinear torsional characteristics, and elastically couples the base plate and the inertia unit in the rotational direction.

The dynamic damper, fixed to the output side of the lock-up device, is herein configured to be activated. Variation in rotational speed can be thereby attenuated. The elastic unit (i.e., the dynamic damper) herein exerts nonlinear torsional characteristics. Thus, a peak of variation in rotational speed, which is to appear in a normal rotation speed range, can be inhibited by appropriately regulating the nonlinear torsional characteristics.

In the fluid power transmission device according to another aspect of the present invention, the elastic unit is configured to exert a first torsional stiffness in a first torsion angular range and exert a second torsional stiffness different from the first torsional stiffness in a second torsion angular range greater than the first torsion angular range.

In the fluid power transmission device according to yet another aspect of the present invention, the elastic unit includes a first elastic member and a second elastic member. The first elastic member is configured to be activated in a first torsion angular range. The second elastic member is configured to be activated only in a second torsion angular range greater than the first torsion angular range.

In the fluid power transmission device according to yet another aspect of the present invention, the elastic unit includes at least two types of elastic members exerting different magnitudes of stiffness.

In the fluid power transmission device according to yet another aspect of the present invention, the elastic unit is mounted to the dynamic damper in a pre-compressed state to begin to elastically deform when torsional torque of the inertia unit with respect to the base plate becomes a predetermined value or greater.

In the fluid power transmission device according to yet another aspect of the present invention, the elastic unit includes an elastic member made of rubber.

In the fluid power transmission device according to yet another aspect of the present invention, the base plate has an annular shape and has a plurality of openings. The openings are bored in an outer peripheral part of the base plate to be circumferentially aligned at predetermined intervals. Further, the inertia unit includes first and second inertia rings and first and second lid members. The first and second inertia rings are disposed to axially interpose therebetween the outer peripheral part of the base plate, respectively have an annular shape, and respectively have openings bored in matched positions with the openings of the base plate. Each of the first and second lid members is disposed on the opposite side of the base plate through each of the first and second inertia rings, and disposed to close the openings of each of the first and second inertia rings. Yet further, the elastic unit includes a plurality of elastic members accommodated in the openings of the base plate and the openings of the first and second inertia rings.

Overall, according to the present invention as described above, it is possible to provide a fluid power transmission device equipped with a dynamic damper whereby high attenuation performance can be stably achieved in an entire normal rotation speed range with a simple construction.

DESCRIPTION OF EXEMPLARY EMBODIMENTS

Entire Construction

Figure 1:
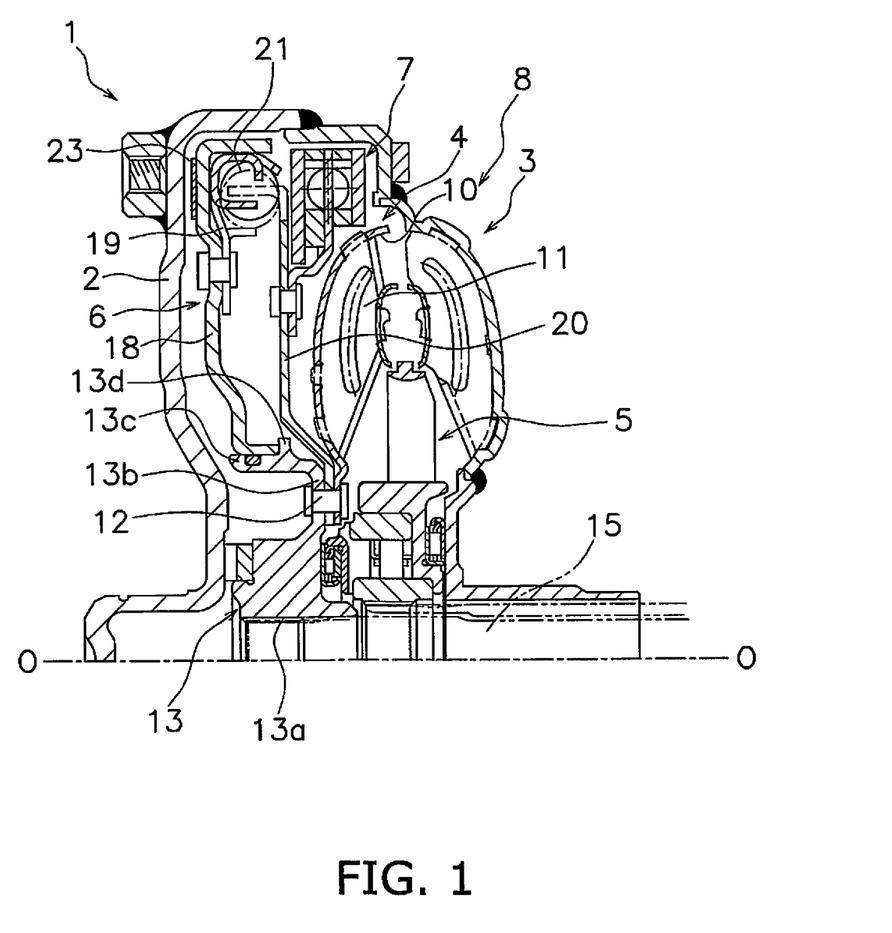
FIG. 1 is a cross-sectional view of a torque converter according to an exemplary embodiment of the present invention.

FIG. 1 shows a torque converter 1 as a fluid power transmission device of the present invention. In FIG. 1, an engine (not shown in the drawings) is disposed on the left side, whereas a transmission (not shown in the drawings) is disposed on the right side. In FIG. 1, a line O-O indicates the rotational axis of the torque converter 1.

The torque converter 1 is a device for transmitting power from a crankshaft (not shown in the drawings) of the engine to an input shaft of the transmission. The torque converter 1 mainly includes a front cover 2 into which power is inputted, an impeller 3, a turbine 4, a stator 5, a lock-up device 6 and a dynamic damper 7. A torque converter body (a fluid coupling body) 8 is composed of the impeller 3, the turbine 4 and the stator 5.

Front Cover 2

The impeller 3 is fixed to the front cover 2. Thus, a fluid chamber is formed by the front cover 2 and the impeller 3. The turbine 4 is disposed inside the fluid chamber to be opposed to the impeller 3. The turbine 4 includes a turbine shell 10, a plurality of turbine blades 11 and a turbine hub 13. The turbine blades 11 are disposed inside the turbine shell 10. The turbine hub 13 is fixed to the turbine shell 10 by rivets 12. The stator 5 is a mechanism for regulating the flow of operating oil from the turbine 4 to the impeller 3. The stator 5 is disposed between the inner peripheral part of the impeller 3 and that of the turbine 4.

The turbine hub 13 has a spline hole 13a in the center part thereof. The input shaft 15 of the transmission is enabled to be engaged with the spline hole 13a. The turbine hub 13 further has a flange part 13b and a tubular part 13c. The flange part 13b extends to the outer peripheral side. The tubular part 13c extends from the outer peripheral part of the flange part 13b toward the front cover 2. As described above, the inner peripheral part of the turbine shell 10 is fixed to the flange part 13b by the rivets 12. In addition, the tubular part 13c has a protrusion 13d protruding from the outer peripheral surface thereof to the further outer peripheral side.

Lock-Up Device 6

Figure 2:
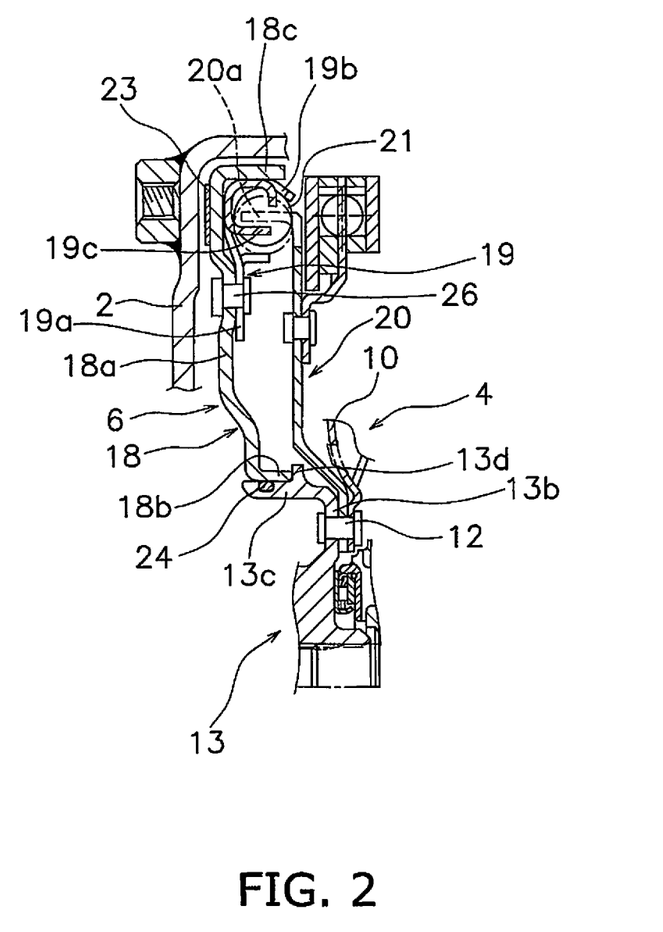
FIG. 2 is a cross-sectional view of a lock-up device extracted from FIG. 1.

FIG. 2 shows the lock-up device 6 extracted from the entire construction. The lock-up device 6 mechanically couples the front cover 2 and the turbine 4 on an as-needed basis. The lock-up device 6 is disposed between the front cover 2 and the turbine 4. The lock-up device 6 includes a piston 18, a drive plate 19, an output plate 20 (an output-side member) and a plurality of coil springs 21 (elastic members).

Piston 18

The piston 18 is disposed between the front cover 2 and the turbine 4 to be movable in the axial direction. The piston 18 has a disc-shaped body 18a, an inner peripheral tubular part 18b and an outer peripheral tubular part 18c. The inner peripheral tubular part 18b extends from the inner peripheral end of the body 18a toward the turbine 4. The outer peripheral tubular part 18c extends from the outer peripheral end of the body 18a toward the turbine 4.

The body 18a is disposed in opposition to the front cover 2. An annular friction member 23 is fixed to the front-cover-2 side lateral surface of the outer peripheral part of the body 18a. The inner peripheral tubular part 18b is supported by the outer peripheral surface of the tubular part 13c of the turbine hub 13 to be movable in the axial direction and the rotational direction. A seal member 24 is disposed on the outer peripheral surface of the tubular part 13c of the turbine hub 13. The seal member 24 seals between the inner peripheral tubular part 18b of the piston 18 and the outer peripheral surface of the tubular part 13c of the turbine hub 13. It should be noted that the tip of the inner peripheral tubular part 18b is contactable to the protrusion 13d of the turbine hub 13. The protrusion 13d restricts the piston 18 from moving toward the turbine 4.

Drive Plate 19

The drive plate 19 is disposed on the turbine-4 side of the piston 18 and is mounted to the outer peripheral part of the piston 18. Further, the drive plate 19 is disposed on the inner peripheral side of the outer peripheral tubular part 18c of the piston 18. The drive plate 19 has an annular shape and has a fixation part 19a, a plurality of spring accommodation parts 19b and a plurality of engaging parts 19c.

The fixation part 19a is the inner peripheral end part of the drive plate 19, and is fixed to the piston 18 by rivets 26. The spring accommodation parts 19b and the engaging parts 19c are alternately disposed in the circumferential direction. The spring accommodation parts 19b respectively have a C-shaped cross-section and accommodate the coil springs 21. The engaging parts 19c respectively have a C-shaped cross-section, and both of the inner and outer peripheral parts thereof are partially engaged with the both ends of the coil springs 21. Power, transmitted to the piston 18, is transmitted to the coil springs 21 through the drive plate 19, i.e., by the engaging parts 19c.

Output Plate 20

The output plate 20 has a disc shape and is disposed between the piston 18 and the turbine 4. The inner peripheral end of the output plate 20 is fixed together with the turbine shell 10 to the flange part 13b of the turbine hub 13 by the rivets 12. The outer peripheral end of the output plate 20 has a plurality of engaging parts 20a bending toward the front cover 2. The engaging parts 20a are engaged with the both ends of the coil springs 21.

Coil Springs 21

The coil springs 21 elastically couple the output plate 20 and both of the piston 18 and the drive plate 19 in the rotational direction. As described above, the coil springs 21 are accommodated in and supported by the spring accommodation parts 19b of the drive plate 19.

Dynamic Damper 7

Figure 3:
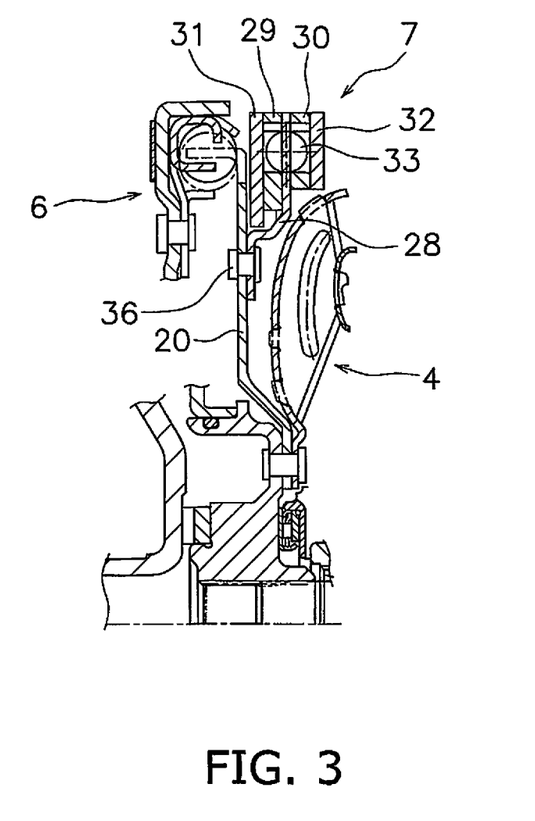
FIG. 3 is a cross-sectional view of a dynamic damper extracted from FIG. 1.
Figure 4:
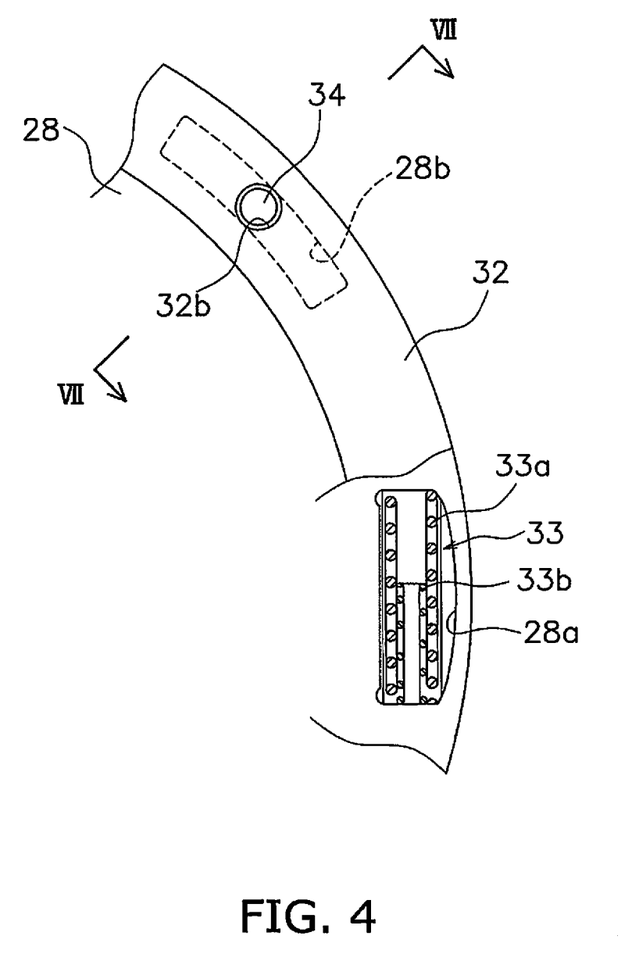
FIG. 4 is a partial front view of the dynamic damper.

The dynamic damper 7 is a device for attenuating variation in speed of rotation from the engine. As shown in FIGS. 1, 3 and 4, the dynamic damper 7 is disposed between the output plate 20 and the impeller 3. The dynamic damper 7 includes a base plate 28, first and second inertia rings 29 and 30, first and second lid members 31 and 32, elastic units 33 and stop pins 34 (see FIG. 4). It should be noted that FIG. 4 is a view of the dynamic damper 7 seen from the transmission side.

Base Plate 28

Figure 5:
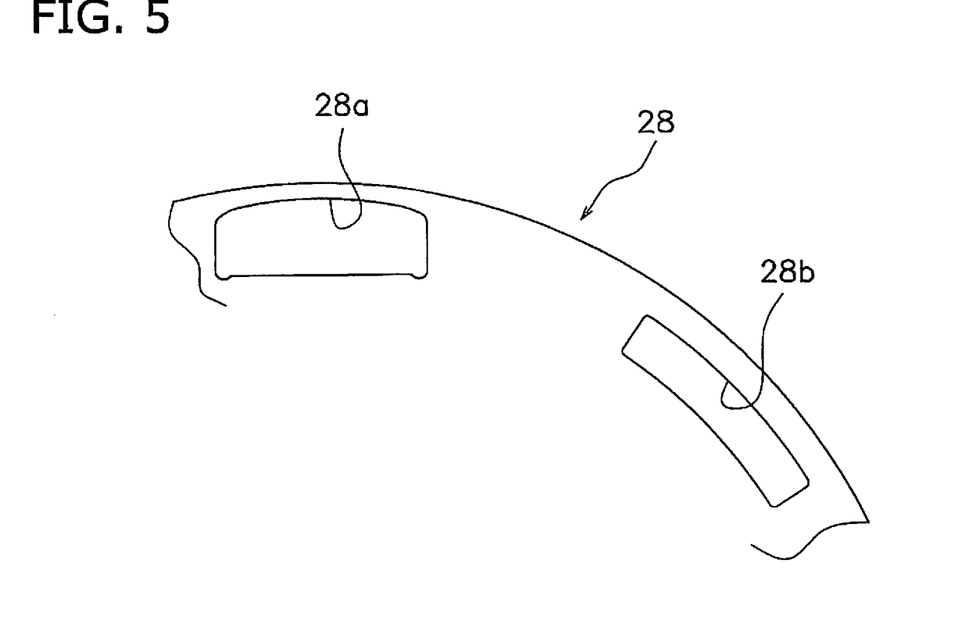
FIG. 5 is a partial front view of a base plate.

FIG. 5 shows a part of the base plate 28. As shown in FIGS. 3 and 5, the base plate 28 has a disc shape, and the inner peripheral end thereof is fixed to the radially intermediate part of the output plate 20 by rivets 36, as shown in FIG. 3. The outer peripheral part of the base plate 28 is formed to shift axially eccentric to the transmission side in comparison with the inner peripheral end of the base plate 28. As shown in FIG. 5, the base plate 28 has a plurality of spring accommodation parts 28a (openings) circumferentially aligned at predetermined intervals. The spring accommodation parts 28a respectively have a predetermined circumferential length. A plurality of elongated holes 28b are formed circumferentially among the spring accommodation parts 28a. The elongated holes 28b respectively have a predetermined circumferential length, and are formed on the circumferential line on which the spring accommodation parts 28a are formed.

First and Second Inertia Rings 29 and 30

The first and second inertia rings 29 and 30 are formed by stamping of sheet metal. The first inertia ring 29 is disposed between the outer peripheral part of the output plate 20 and that of the base plate 28. The second inertia ring 30 is disposed on the transmission side of the base plate 28. The outer diameter of the first inertia ring 29 is equal to that of the second inertia ring 30, but the inner diameter of the first inertia ring 29 is smaller than that of the second inertia ring 30.

Figure 6:
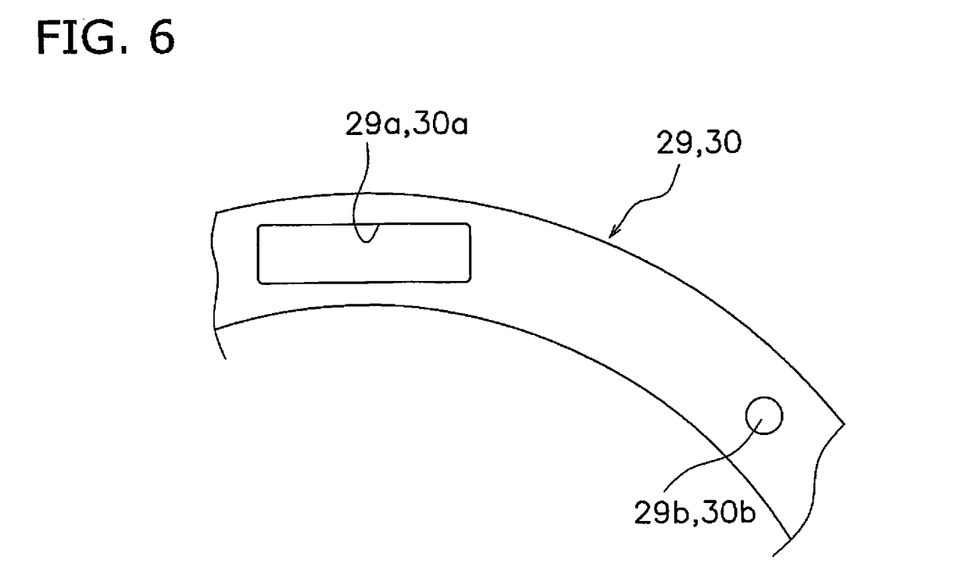
FIG. 6 is a partial front view of an inertia ring.

As shown in FIG. 6, each of the first and second inertia rings 29 and 30 has the plural spring accommodation parts 29a, 30a (openings) circumferentially aligned at predetermined intervals. It should be noted that as described above, the inner diameter of the first inertia ring 29 and that of the second inertia ring 30 are different from each other, but are depicted as having equal dimension and shape for convenience in FIG. 6. The spring accommodation parts 29a and 30a are formed in matched positions with the spring accommodation parts 28a of the base plate 28. Further, each of the first and second inertia rings 29 and 30 has through holes 29b, 30b, and each through hole 29b, 30b is formed in a matched position with the circumferential middle of each elongated hole 28b of the base plate 28.

First and Second Lid Members 31 and 32

Figure 7:
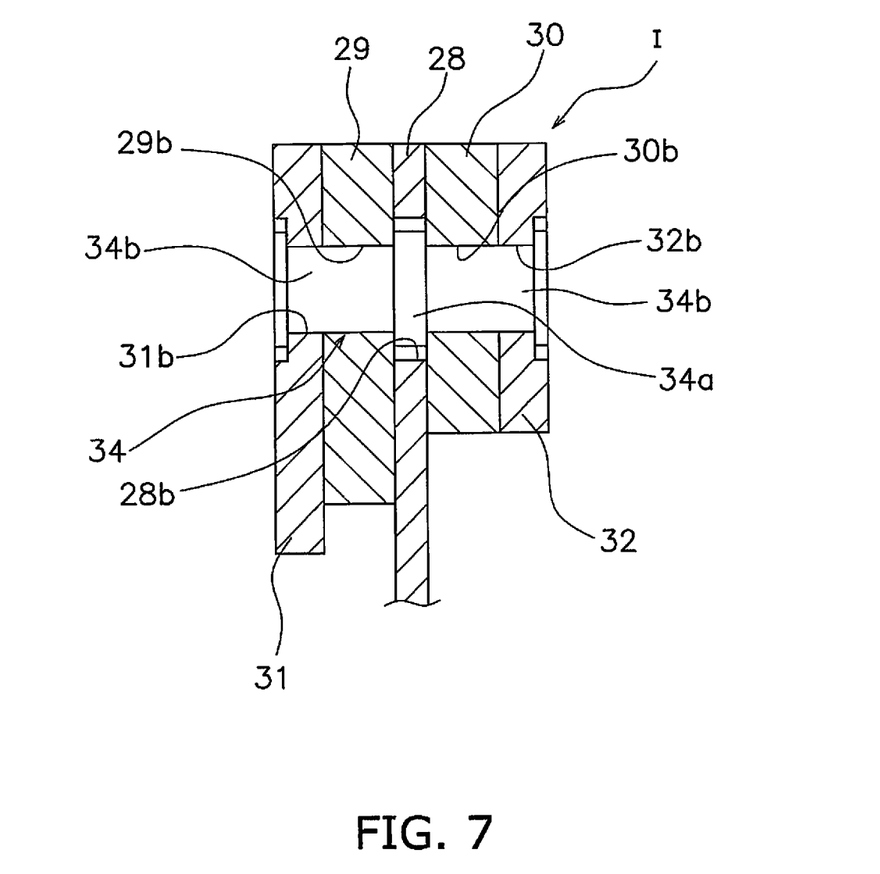
FIG. 7 is a cross-sectional view of the dynamic damper.

The first lid member 31 is disposed on the further engine side of the engine-side first inertia ring 29. The first lid member 31 is an annular member, and the inner diameter thereof is further smaller than that of the first inertia ring 29. As shown in FIG. 7, the first lid member 31 has through holes 31b bored in matched positions with the through holes 29b of the first inertia ring 29 and the through holes 30b of the second inertia ring 30. It should be noted that FIG. 7 is a cross-sectional view of FIG. 4 taken along a cutaway line VII-VII.

The second lid member 32 is disposed on the further transmission side of the second inertia ring 30. The second lid member 32 is an annular member, and the inner diameter thereof is equal to that of the second inertia ring 30. The second lid member 32 has through holes 32b bored in matched positions with the through holes 29b of the first inertia ring 29 and the through holes 30b of the second inertia ring 30.

Elastic Units 33

As shown in FIG. 4, each elastic unit 33 is composed of a large coil spring 33a and a small coil spring 33b, which are accommodated in each spring accommodation part 28a of the base plate 28 and each pair of the spring accommodation parts 29a and 30a of the first and second inertia rings 29 and 30. The length of the large coil spring 33a is roughly equal to that of each spring accommodation part 28a. Therefore, the both ends of the large coil spring 33a make contact with the circumferential ends of the respective spring accommodation parts 28a, 29a and 30a. On the other hand, the small coil spring 33b is disposed inside the large coil spring 33a, and the length thereof is set to be shorter than that of the large coil spring 33a. Hence, activation of the small coil spring 33b is configured to be delayed in comparison with that of the large coil spring 33a.

Stop Pins 34

As shown in FIG. 7, each stop pin 34 has a large diameter trunk 34a in the axially middle part thereof, and further, has small diameter trunks 34b on the both sides of the large diameter trunk 34a.

The diameter of the large diameter trunk 34a is larger than the diameters of the through holes 29b and 30b of the first and second inertia rings 29 and 30, but is smaller than the diameter (radial dimension) of each elongated hole 28b of the base plate 28. Further, the thickness of the large diameter trunk 34a is slightly thinner than that of the base plate 28.

The snail diameter trunks 34b penetrate through the through holes 29b and 30b of the first and second inertia rings 29 and 30 and the through holes 31b and 32b of the first and second lid members 31 and 32. Further, the both inertia rings 29 and 30 and the both lid members 31 and 32 are fixed to the axially both sides of the base plate 28 by swaging the heads of the small diameter trunks 34b.

With the construction as described above, the base plate 28 and a unit of the two inertia rings 29 and 30 and the two lid members 31 and 32 (note the first and second inertia rings 29 and 30 and the first and second lid members 31 and 32 will be hereinafter collectively referred to as "an inertia unit I") are rotatable relatively to each other as long as each stop pin 34 is movable within each elongated hole 28b of the base plate 28. However, relative rotation of the base plate 28 and the inertia unit I is prevented when the large diameter trunk 34a of each stop pin 34 contacts one of the circumferential ends of each elongated hole 28b.

Actions

First, actions of the torque converter body will be briefly explained. In the condition that the front cover 2 and the impeller 3 are rotated, the operating oil flows from the impeller 3 to the turbine 4, and power is transmitted from the impeller 3 to the turbine 4 through the operating oil. The power transmitted to the turbine 4 is further transmitted to the input shaft 15 of the transmission through the turbine hub 13.

When the speed ratio of the torque converter 1 increases and the rotational speed of the input shaft 15 reaches a predetermined speed, the operating oil between the front cover 2 and the piston 18 is drained whereas the operating oil is supplied to the turbine-4 side of the piston 18. Accordingly, the piston 18 is moved toward the front cover 2. As a result, the friction member 23 fixed to the piston 18 is pressed onto the front cover 2, and a lock-up clutch is turned on.

In the clutch-on state as described above, the power from the engine is transmitted to the input shaft 15 of the transmission through a path of the front cover 2, the piston 18, the drive plate 19, the coil springs 21, the output plate 20 and the turbine hub 13 in this order.

In the lock-up device 6, power is transmitted through the aforementioned path, and variation in speed of rotation to be inputted thereto from the engine is absorbed and attenuated by activation of the plural coil springs 21.

Actions of Dynamic Damper 7

The dynamic damper 7 fixed to the output plate 20 is activated by rotation of the output plate 20, and variation in speed of rotation of the engine is inhibited by the action of the dynamic damper 7. When described in detail, the rotational phase of the base plate 28 and that of the inertia unit I are displaced by the action of the elastic units 33. Specifically at a predetermined engine rotation speed, the rotational speed of the inertia unit I varies at a phase whereby variation in rotational speed of the base plate 28 is cancelled out. With the phase displacement, variation in rotational speed of the transmission can be absorbed.

Figure 8:
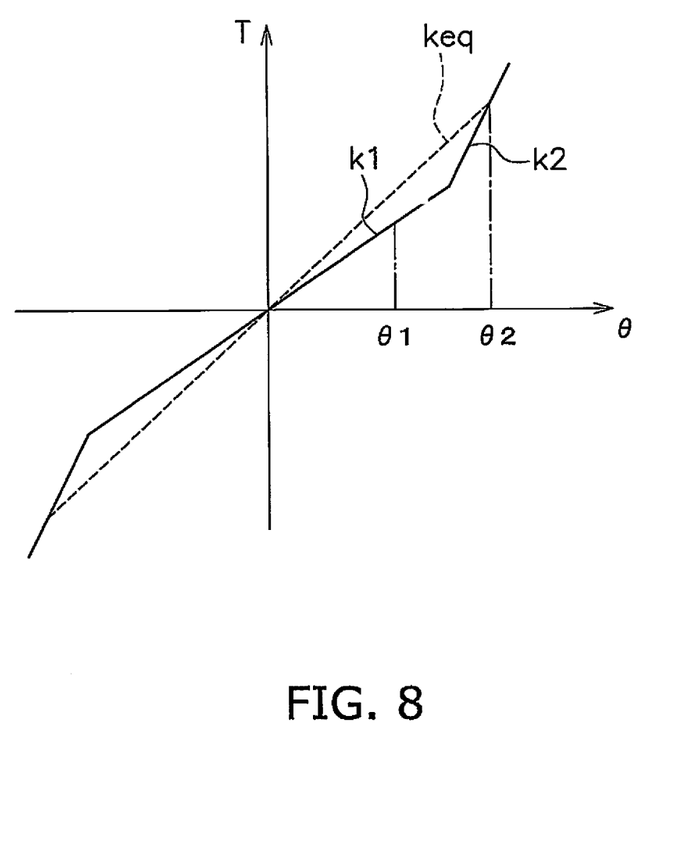
FIG. 8 is a torsional characteristic diagram of the dynamic damper.

More specifically, when relative rotation is caused between the base plate 28 and the inertia unit I in the dynamic damper 7, only the large coil springs 33a are firstly compressed and the dynamic damper 7 is activated by a torsional characteristic with low stiffness (first stage torsional characteristic; torsional stiffness k1 shown in FIG. 8).

Then, when greater rotational variation is caused and greater relative rotation is caused between the base plate 28 and the inertia unit I, not only the large coil springs 33a but also the small coil springs 33b are compressed. Hence, the dynamic damper 7 is activated by a torsional characteristic with higher stiffness than the first stage torsional characteristic (second stage torsional characteristic; torsional stiffness k2 shown in FIG. 8). At this time, equivalent stiffness of the dynamic damper 7 is keq depicted with a broken line in FIG. 8.

Figure 9:
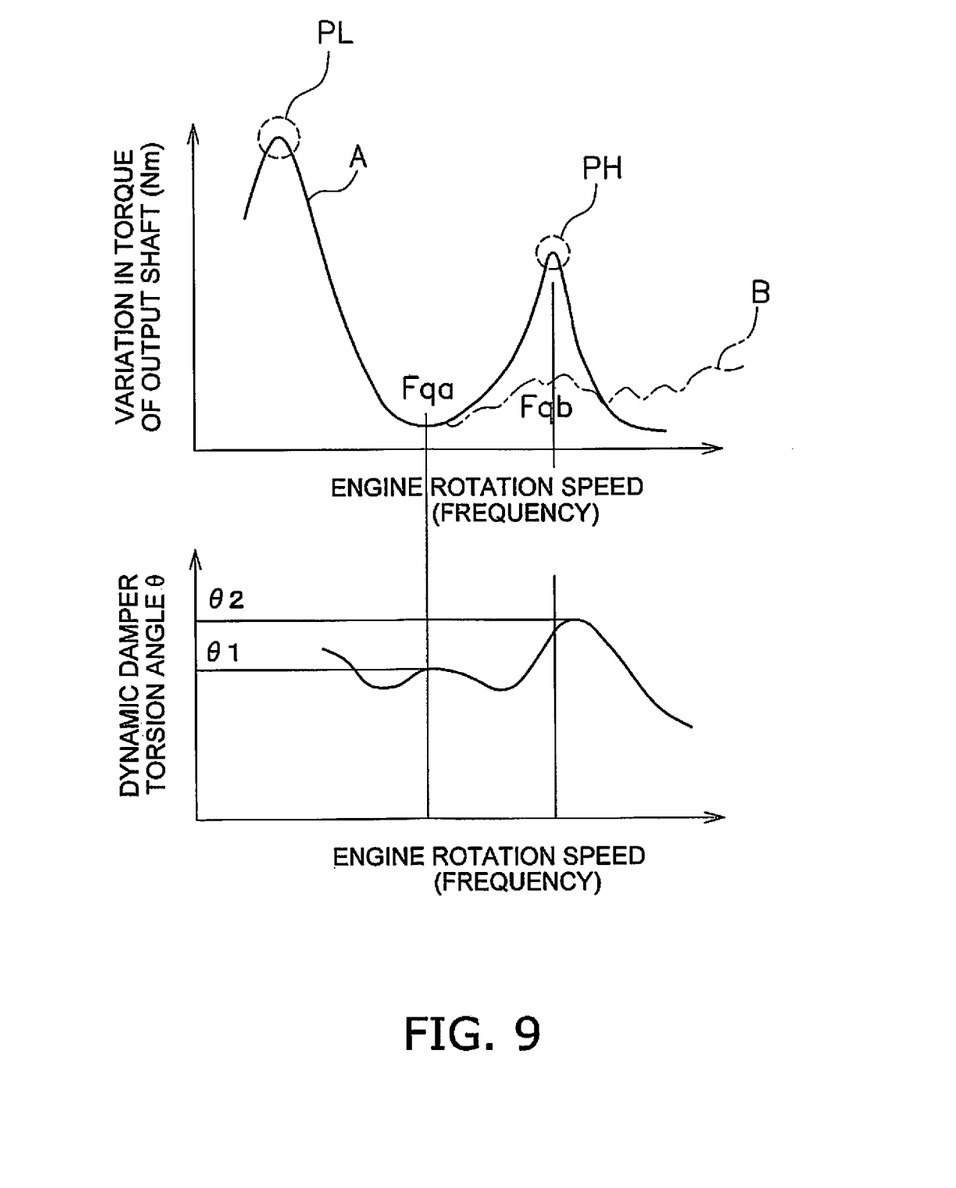
FIG. 9 includes a chart for representing a relation between engine rotation speed and variation in output-side torque and a chart for representing a relation between engine rotation speed and torsion angle of the dynamic damper.

Now, FIG. 9 represents a relation between engine rotation speed (frequency) and torsion angle of the dynamic damper 7 and a relation between engine rotation speed (frequency) and variation in torque to be transmitted to the transmission. As shown in FIG. 9, in the dynamic damper 7, the torsion angle becomes a relatively small angle θ1 in a low engine rotation speed range. On the other hand, the torsion angle becomes a larger angle θ2 in a high engine rotation speed range.

In FIG. 9, Fqa indicates a resonance frequency (natural frequency) where the stiffness of the dynamic damper 7 is k1. At the frequency Fqa, the base plate 28 and the inertia rings 29 and 30 vibrate in opposite phases, and vibrations of the base plate 28 are reduced the most. On the other hand, Fqb indicates a peak frequency where the stiffness of the dynamic damper 7 is k1. At the frequency Fqb, the inertia rings 29 and 30 amplify vibrations of the base plate 28.

As depicted with a characteristic A in FIG. 9, when a well-known dynamic damper having a one-stage linear torsional characteristic is mounted to an output plate (turbine), variation in torque can be inhibited at the frequency Fqa, but two peaks PL and PH of variation in torque appear in a low rotation speed range and a high rotation speed range. The peak PL in the low rotation speed range can be herein set to be lower than an idle rotation speed and thus is not problematic.

On the other hand, the peak PH in the high rotation speed range appears in a normal rotation speed range. Thus, it is important to shift the peak PH from the normal rotation speed range to a higher rotation speed range.

To cope with the above, in the present preferred embodiment, two stage torsional characteristics are set for the dynamic damper 7 as shown in FIG. 8. Thus, the torsional characteristics of the dynamic damper 7 are set to be nonlinear in the entire activation range thereof. In the setting, the peak PH, supposed to appear in the high rotation speed range, can be shifted from the normal rotation speed range to the higher rotation speed range by appropriately setting the two stage characteristics in consideration of engine specification and so forth. Specifically, the peak PH is shifted to the higher rotation speed range by setting two stage torsional characteristics for the dynamic damper 7 and by setting the equivalent stiffness of the dynamic damper 7 to be keq. Consequently, variation in torque can be attenuated at the frequency Fqb. A characteristic B in the setting is depicted with a dashed dotted line in FIG. 9.

Other Exemplary Embodiments

The present invention is not limited to the exemplary embodiment as described above, and a variety of changes or modifications can be made without departing from the scope of the present invention.

In the aforementioned exemplary embodiment, each elastic unit 33 is composed of the large and small coil springs 33a and 33b accommodated in one spring accommodation part 28a. However, the construction of the elastic unit is not limited to the above.

Figure 10:
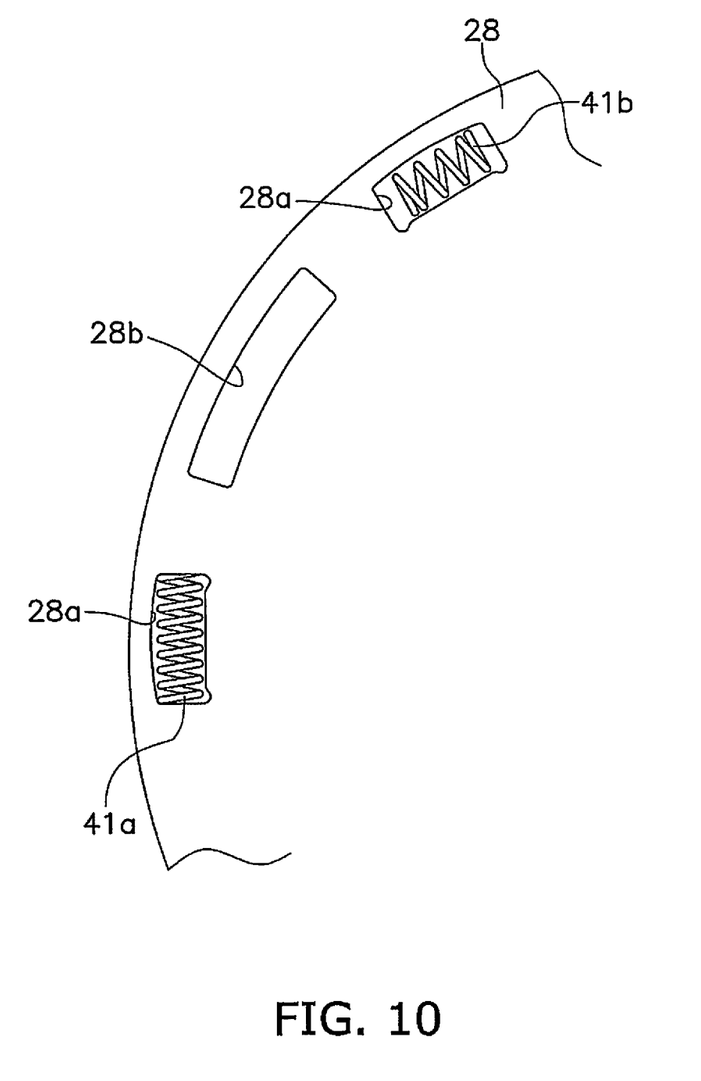
FIG. 10 is a diagram showing an elastic unit according to another preferred embodiment.

For example, as shown in FIG. 10, first coil springs 41a may be disposed in some spring accommodation parts 28a, whereas second coil springs 41b shorter than the first coil springs 41a may be disposed in the other spring accommodation parts 28a.

In the aforementioned exemplary embodiment, two stage torsional characteristics are set for the dynamic damper 7 to make the torsional characteristics of the dynamic damper 7 nonlinear. However, torsional characteristics with more than two stages may be set for the dynamic damper 7.

Figure 11:
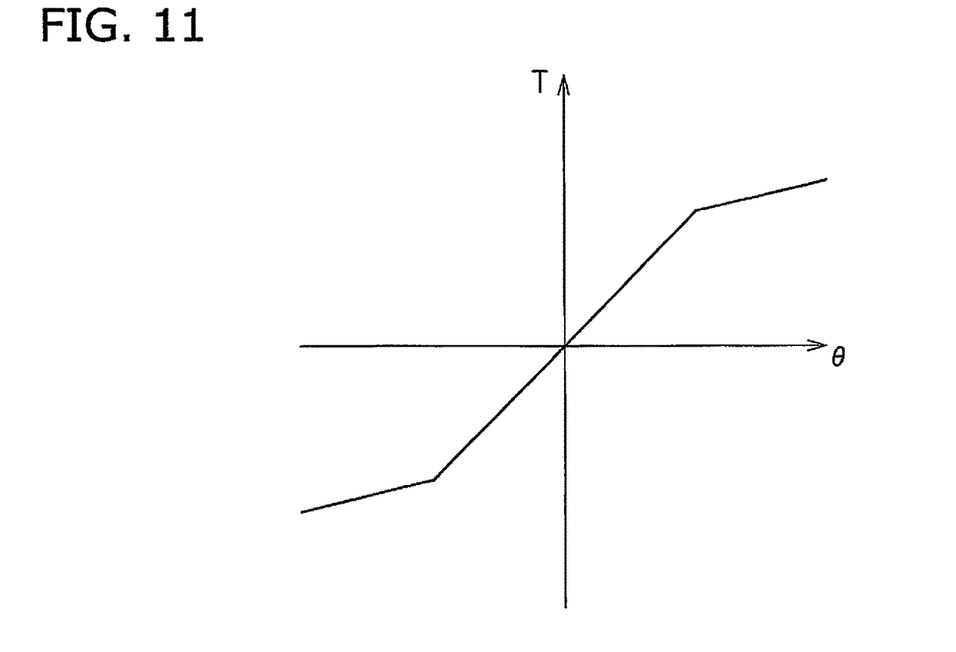
FIG. 11 is a torsional characteristic diagram of a dynamic damper according to another exemplary embodiment.

In the aforementioned exemplary embodiment, the torsional characteristic with low stiffness is configured to be exerted in the low angular range, whereas the torsional characteristic with high stiffness is configured to be exerted in the high angular range. However, as shown in FIG. 11, torsional characteristic with high stiffness may be configured to be exerted in the low angular range, whereas torsional characteristic with low stiffness may be configured to be exerted in the high angular range. In the configuration, when the frequency is Fqa, vibrations are effectively reduced by the first stage stiffness. On the other hand, when the frequency is Fqb, the torsion angle of the dynamic damper increases and the stiffness of the dynamic damper decreases. Accordingly, the peak PH is shifted to the low rotation speed side, and does not substantially appear.

Figure 12:
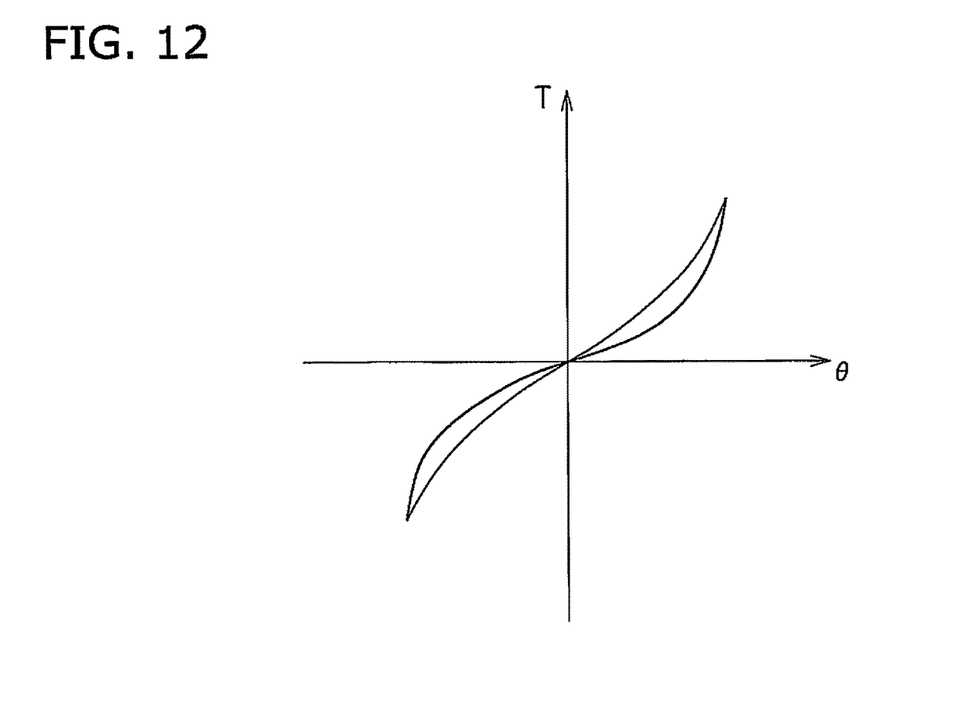
FIG. 12 is a torsional characteristic diagram of a dynamic damper according to yet another exemplary embodiment.

Each elastic unit may be formed by an elastic member made of rubber. FIG. 12 represents exemplary torsional characteristics in the construction. Even with the construction, the torsional characteristics of the dynamic damper can be set to be nonlinear.

Figure 13:
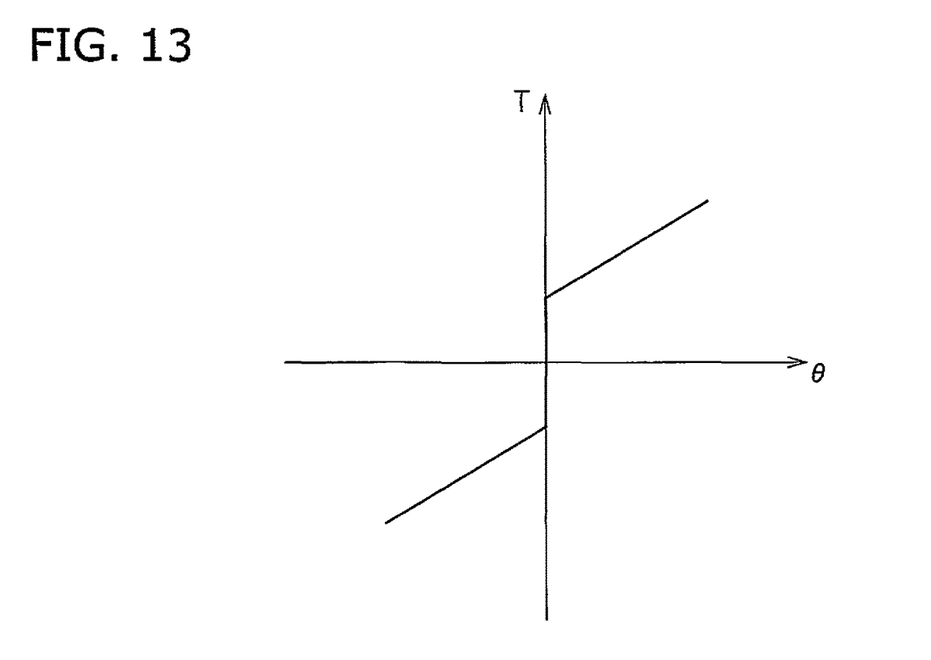
FIG. 13 is a torsional characteristic diagram of a dynamic damper according to further yet another exemplary embodiment.

Torsional characteristics may be set to be nonlinear by applying initial torque to the torsional characteristics. Specifically, it is herein only required to set the coil springs of a preliminarily compressed state in the spring accommodation parts. In the construction, the coil springs begin to elastically deform when the torsional torque of the inertia rings 29 and 30 and the lid members 31 and 32 with respect to the base plate 28 becomes a predetermined value or greater. FIG. 13 represents the torsional characteristics in the construction.

Figure 14:
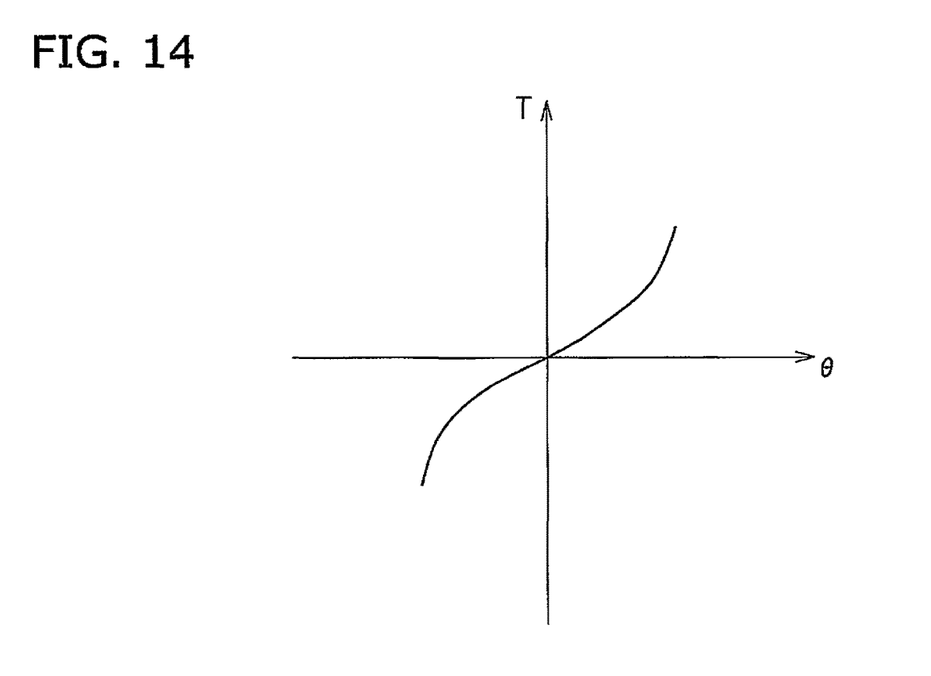
FIG. 14 is a torsional characteristic diagram of a dynamic damper according to still further yet another exemplary embodiment.

As shown in FIG. 14, the torsional characteristics may be in the shape of a curve. Specifically, it is herein only required to produce coil springs with uneven coil pitches. In such coil springs, the coiled parts thereof are configured to be gradually contacted in accordance with the torsion angle. Put differently, the stiffness of the coil springs is configured to increase with increase in the torsion angle.

In the aforementioned exemplary embodiment, the clutch portion is composed of the piston and the friction member. However, the clutch portion may be of a multi-plate type having a plurality of clutch plates.

The invention claimed is:
1. A fluid power transmission device for transmitting power from an engine to a transmission through a fluid, comprising:
   a front cover;
   a fluid coupling body including a turbine and configured to transmit the power from the engine to the transmission through the fluid, the turbine being disposed to be unitarily rotatable with an input shaft of the transmission;
   a lock-up device disposed between the front cover and the turbine and including a clutch portion and an output-side member, the clutch portion being configured to transmit or block the power from the front cover, the output-side member receiving the power transmitted thereto from the clutch portion and being coupled to the turbine; and
   a dynamic damper fixed to the output-side member of the lock-up device and configured to attenuate variation in speed of rotation from the engine,
   the dynamic damper including
      a base plate fixed to the output-side member of the lock-up device,
      an inertia unit movable relative to the base plate in a rotational direction, the inertia unit having at least one inertia ring having a plurality of openings, and
      an elastic unit exerting nonlinear torsional characteristics and elastically coupling the base plate and the inertia unit in the rotational direction, the elastic unit including a plurality of elastic members accommodated in each of the plurality of openings in the at least one inertia ring.
2. The fluid power transmission device according to claim 1, wherein the elastic unit is configured to exert
   a first torsional stiffness in a first torsion angular range, and
   a second torsional stiffness different from the first torsional stiffness in a second torsion angular range greater than the first torsion angular range.
3. The fluid power transmission device according to claim 1, wherein the elastic unit includes
   a first elastic member configured to be activated in a first torsion angular range, and
   a second elastic member configured to be activated only in a second torsion angular range greater than the first torsion angular range.
4. The fluid power transmission device according to claim 1, wherein the elastic unit includes at least two types of elastic members exerting different magnitudes of stiffness.
5. The fluid power transmission device according to claim 1, wherein the elastic unit is mounted to the dynamic damper in a pre-compressed state to begin to elastically deform when torsional torque of the inertia unit with respect to the base plate becomes a predetermined value or greater.
6. The fluid power transmission device according to claim 1, wherein the elastic members are made of rubber.
7. The fluid power transmission device according to claim 1, wherein
   the base plate has an annular shape and has a plurality of openings, the openings being bored in an outer peripheral part of the base plate to be circumferentially aligned at predetermined intervals,
   the inertia unit includes
   first and second inertia rings disposed to axially interpose therebetween the outer peripheral part of the base plate, respectively having an annular shape, and respectively having openings bored in matched positions with the openings of the base plate, and first and second lid members disposed on opposite sides of the base plate and disposed to close the openings of each of the first and second inertia rings, and the plurality of elastic members being accommodated in the openings of the base plate and the openings of the first and second inertia rings.

8. The fluid power transmission device according to claim 2, wherein the elastic unit includes a first elastic member configured to be activated in a first torsion angular range, and a second elastic member configured to be activated only in a second torsion angular range greater than the first torsion angular range.

9. The fluid power transmission device according to claim 8, wherein the elastic unit includes at least two types of elastic members exerting different magnitudes of stiffness.

10. The fluid power transmission device according to claim 9, wherein the elastic unit is mounted to the dynamic damper in a pre-compressed state to begin to elastically deform when torsional torque of the inertia unit with respect to the base plate becomes a predetermined value or greater.

11. The fluid power transmission device according to claim 10, wherein the elastic members are made of rubber.

12. The fluid power transmission device according to claim 11, wherein the base plate has an annular shape and has a plurality of openings, the openings being bored in an outer peripheral part of the base plate to be circumferentially aligned at predetermined intervals, the inertia unit includes first and second inertia rings disposed to axially interpose therebetween the outer peripheral part of the base plate, respectively having an annular shape, and respectively having openings bored in matched positions with the openings of the base plate, and first and second lid members disposed on opposite sides of the base plate and disposed to close the openings of each of the first and second inertia rings, and the plurality of elastic members being accommodated in the openings of the base plate and the openings of the first and second inertia rings.

* * * * *